United States Patent
Kim et al.

(10) Patent No.: US 12,520,736 B2
(45) Date of Patent: Jan. 6, 2026

(54) 3D VERTICAL MEMORY DEVICE AND MANUFACTURING METHOD THEREOF

(71) Applicant: POSTECH Research and Business Development Foundation, Pohang-si (KR)

(72) Inventors: Seyoung Kim, Pohang-si (KR); Doyoon Kim, Goyang-si (KR); Hyunjeong Kwak, Daejeon (KR); Jeonghoon Son, Pohang-si (KR); Chuljun Lee, Seoul (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 697 days.

(21) Appl. No.: 17/871,855

(22) Filed: Jul. 22, 2022

(65) Prior Publication Data

US 2023/0047277 A1 Feb. 16, 2023

(30) Foreign Application Priority Data

Aug. 5, 2021 (KR) .......................... 10-2021-103372

(51) Int. Cl.
| | |
|---|---|
| H01L 45/00 | (2006.01) |
| G06N 3/04 | (2023.01) |
| H10B 63/00 | (2023.01) |
| H10N 70/00 | (2023.01) |
| H10N 70/20 | (2023.01) |

(52) U.S. Cl.
CPC ............ *H10N 70/253* (2023.02); *G06N 3/04* (2013.01); *H10B 63/34* (2023.02); *H10N 70/011* (2023.02); *H10N 70/24* (2023.02)

(58) Field of Classification Search
CPC .............................. H10N 70/253; G06N 3/04
See application file for complete search history.

(56) References Cited

U.S. PATENT DOCUMENTS

| | | | | |
|---|---|---|---|---|
| 9,728,721 | B2 * | 8/2017 | Tan | H10N 70/8828 |
| 11,055,606 | B2 * | 7/2021 | Zhang | G11C 11/54 |
| 11,355,505 | B2 * | 6/2022 | Morris | H10D 1/716 |
| 11,914,860 | B2 * | 2/2024 | Lai | G06F 3/0673 |
| 2016/0133671 | A1 * | 5/2016 | Fantini | H01L 21/76837 |
| | | | | 257/4 |
| 2018/0175050 | A1 * | 6/2018 | Son | H10B 43/40 |
| 2022/0123208 | A1 * | 4/2022 | Yu | H10N 70/063 |
| 2022/0199783 | A1 * | 6/2022 | Penumatcha | H10D 84/038 |
| 2023/0008554 | A1 * | 1/2023 | Kao | H10D 30/6757 |
| 2023/0047277 | A1 * | 2/2023 | Kim | H10N 70/245 |
| 2023/0146353 | A1 * | 5/2023 | Or-Bach | H01L 23/5283 |
| | | | | 257/324 |

FOREIGN PATENT DOCUMENTS

| | | |
|---|---|---|
| KR | 10-2019-0131403 | 11/2019 |
| KR | 10-2020-0115722 | 10/2020 |

\* cited by examiner

*Primary Examiner* — Thao P Le
(74) *Attorney, Agent, or Firm* — Morgan, Lewis & Bockius LLP

(57) ABSTRACT

Provided is a three-dimensional vertical memory device including: a semiconductor substrate, a vertical columnar channel region provided on the semiconductor substrate and having a void of a predetermined size therein; a source electrode and a drain electrode spaced apart from each other with the channel region interposed therebetween; and a gate stack formed on the channel region.

9 Claims, 13 Drawing Sheets

3D VERTICAL MEMORY DEVICE AND MANUFACTURING METHOD THEREOF

TECHNICAL FIELD

The present disclosure relates to a three-dimensional (3D) vertical memory device and a manufacturing method thereof, and more particularly, to a 3D vertical resistance random memory device of a neuromorphic system having a vertical columnar channel region having a void therein and a manufacturing method thereof.

BACKGROUND

Recently, neuromorphic devices to implement artificial neural networks in hardware are being studded and researched in various ways. A neuromorphic device mimics the structures of neurons and synapses constituting the brain nervous system of a human being, and a neuromorphic device generally have structures of pre-synaptic neurons, synapses, and post-synaptic neurons located after synapses. A synapse is a connection point between a neuron and another neuron, and has the function of updating and memorizing a synaptic weight in accordance with spike signals generated from the both neurons. Meanwhile, a crossbar memory is the most used structure in synapse device researches based on two-terminal memory devices such as a resistive random access memory, a phase-change random access memory, and a conductive bridging random access memory. The crossbar memory structure is suitable for a neuromorphic synaptic device because of its simple structure and advantage of being able to implement a high-density device array. However, in two-terminal memory-based synaptic devices each having a crossbar array, one terminal is used as a ground and a voltage pulse is applied to the other terminal to change an internal resistance value of a corresponding synapse device so as to learn a synapse, and a voltage is applied again to verify the synapse device by reading a resistance value of the synapse device. Therefore, there is a fatal disadvantage that a resistance value of a learned synapse is changed by an applied voltage when the learned resistance of the synapse is to be verified. This makes it difficult to precisely control a resistance of a synaptic device, which significantly affects the learning rate of the neuromorphic system. Recently, three-terminal transistor-based synaptic devices to compensate for the weakness of the two-terminal memory-based synaptic devices have been reported.

In Korean Patent Application Publication No. 10-2019-0131403 relates to a neuromorphic device with a three-dimensional deposited synaptic structure including: a plurality of unit synaptic modules, each unit synaptic module including a plurality of deposited synaptic layers and a first decoder deposited between some of the synaptic layers; a second decoder providing a level selection signal to a first decoder included in a unit synaptic module to be accessed among the unit synaptic modules; and a third decoder for generating an address of a memristor to be accessed in a memristor array of a synaptic layer included in the unit synaptic module to be accessed, wherein in each of the unit synaptic modules, memristors included in synaptic layers adjacent to each other include a deposited structure symmetrical to each other.

Korean Patent Application Publication No. 10-2020-0115722 includes: a semiconductor substrate; a channel region located on the semiconductor substrate; a source electrode and a drain electrode spaced apart from each other with the channel region interposed therebetween; a dopant reservoir layer disposed on the channel region; a gate electrode disposed on the dopant reservoir layer; and a diffusion barrier layer formed between the channel region and the dopant reservoir layer to control movement of active ions formed in the dopant reservoir layer.

RELATED ART DOCUMENTS

Patent Document

Korean Patent Application Publication No. 10-2019-0131403 (Nov. 26, 2019)

Korean Patent Application Publication No. 10-2020-0115722 (Oct. 8, 2020)

SUMMARY

The present disclosure provides a three-dimensional vertical memory device and a manufacturing method thereof, the memory device in which a gate, a source electrode, and a drain electrode are sequentially disposed in a vertical columnar channel region having a void structure therein in a neuromorphic system, and the void structure which causes electricity conductivity to be lowered and accordingly reduces power consumption.

The present disclosure provides a three-dimensional vertical memory device and a manufacturing method thereof, the memory device in which a vertical columnar channel region having a void structure is formed to reduce power consumption required for deep learning acceleration in a synaptic array, thereby helping implementation of low-power, high-efficiency on-device training.

In embodiments, a three-dimensional (3D) vertical memory device includes: a semiconductor substrate; a vertical columnar channel region provided on the semiconductor substrate and having a void of a predetermined size therein; a source electrode and a drain electrode spaced apart from each other with the channel region interposed therebetween; and a gate stack formed on the channel region.

The source electrode may be in contact with a lower side of the channel region and in a shape of a line extending in a first direction.

The drain electrode may be in contact with a middle portion of the channel region spaced apart by a predetermined distance from the upper side of the source electrode and in a shape of a line extends in a second direction crossing the first direction.

The channel region may be a vertical columnar shape in which an upper surface, a lower surface, and an inner surface are surrounded by a channel material of a predetermined thickness, and the channel material may be a metal oxide.

A resistance of the memory device with the channel region having the void therein may be expressed as $R\_void = \rho\, h/(\pi(r\_2^2 - r\_1^2))$, where $h$ denotes a height of the channel region, $r1$ denotes a distance from a center of the channel region to an outer wall, and $r2$ denotes a distance from the center of the channel region to an inner wall.

In embodiments, a manufacturing method of a three-dimensional (3D) vertical memory device includes: forming a source electrode, an insulating film, and a drain electrode on a semiconductor substrate; etching the drain electrode, the insulating film, and the source electrode to form a trench that defines a channel region; depositing a channel material in the trench, wherein the channel material is deposited only on a bottom and an inner wall of the trench to form a vertical columnar channel region having a void structure in the trench; and forming a gate stack on the channel region.

The source electrode may be in contact with a lower side of the channel region and in a shape of a line shape extending in a first direction, the drain electrode may be in contact with a middle portion of the channel region spaced apart by a predetermined distance from an upper side of the source electrode and in a shape of a line extending in a second direction crossing the first direction.

The channel material may be formed by depositing a metal oxide in a sputtering method, and a void may be lastly formed in the trench due to a difference in deposition degree inside and outside the trench.

The channel region may be a vertical columnar shape surrounded by a channel material of a predetermined thickness provided on an upper surface, a lower surface, and an inner surface.

A resistance of the memory device with the channel region having the void structure may be expressed as $R\_void = \rho \ h/(\pi(r\_2^2 - r\_1^2))$, where h denotes a height of the channel region, r1 denotes a distance from a center of the channel region to an outer wall, and r2 denotes a distance from the center of the channel region to an inner wall.

The disclosed technique may have the following effects. However, it does not mean that a particular exemplary embodiment includes all of, or only, the following effects, and thus, it should not be understood that the scope of right of the present disclosure is not limited to the following.

In a three-dimensional vertical memory device and a manufacturing method thereof according to an embodiment of the present disclosure, a gate, a source electrode, and a drain electrode are sequentially disposed in a vertical columnar channel region having a void structure therein in a neuromorphic system, there is an effect of lowering electricity conductivity, by which power consumption can be reduced.

In addition, in the three-dimensional vertical memory device and the manufacturing method thereof according to an embodiment of the present disclosure, as a vertical columnar channel region having a void structure is formed, it is possible to reduce power consumption required for deep learning acceleration in a synaptic array, thereby helping implementation of low-power, high-efficiency on-device training.

DETAILED DESCRIPTION

Figure 1:
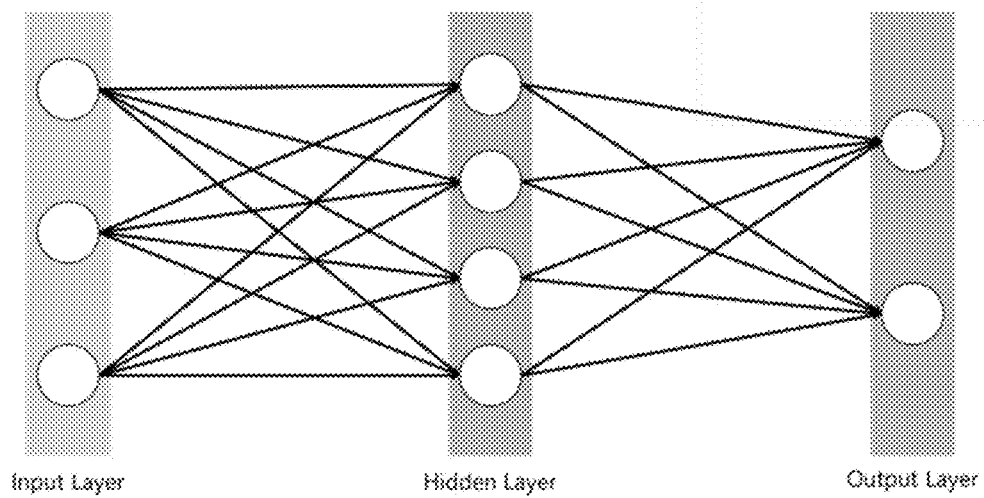
FIG. 1 is a diagram illustrating a fully connected layer neural network having a general multi-layer fully coupled hierarchical structure.

Descriptions of the present disclosure are exemplary embodiments for structural or functional descriptions, and the scope of the disclosed skill is not to be understood to be restricted by the exemplary embodiments described in the specification. That is, it is to be understood that the exemplary embodiments are intended to cover various modifications and equivalent arrangements included within the spirit and scope of the appended claims. Further, the proposed objects or effects in the disclosed technique do not signify that a specific exemplary embodiment may include all of them or include the effects, so the scope of the disclosed skill is not to be understood to be restricted by the exemplary embodiments described in the specification.

In addition, terms that are described in the present disclosure are to be understood as follows.

Terms such as "first," "second," etc., may be used to distinguish one constituent element from another constituent element, but the scope must not be restricted by the terms. For example, a first constituent element may be called a second constituent element, and similarly, the second constituent element may be called the first constituent element.

It is noted that when it is described that a certain constituent element is "connected" to another constituent element, they may be directly connected or electrically connected to each other, and a third constituent element may exist therebetween. On the contrary, it is also noted that when it is described that a certain constituent element is "directly connected" or "directly electrically connected" to another constituent element, a third constituent element does not exist therebetween. In addition, other expressions that describe relationships among constituent elements such as, "between," "just between," or "adjacent to" and "directly adjacent to" must be understood in a like manner.

An expression used in the singular encompasses an expression of the plural, unless it has a clearly different meaning in the context, and it is to be understood that terms such as "including," "having," etc. are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or may be added.

Identification codes (e.g., a, b, c, etc.) in respective stages are used for better comprehension and ease of description, but they do not necessarily describe an order of the respective stages, and the respective stages may be performed in a different order from the described order unless a specific order is written in the context. That is, the respective stages may be performed according to the described order, they may be performed substantially simultaneously, and they may be performed in an opposite order. That is, the respective steps may occur in the same order as specified, may be performed substantially simultaneously, or may be performed in the reverse order.

In addition, unless defined otherwise in the detailed description, all the terms have the same meaning as meanings generally understood by those skilled in the art to which the present disclosure pertains. Generally used terms such as terms defined in a dictionary should be interpreted as the same meanings as meanings within a context of the related art, and should not be interpreted as ideally or excessively formal meanings unless clearly defined in the present specification.

With reference to the accompanying drawings, preferred embodiments of the present disclosure will be described in more detail. Hereinafter, the same reference numerals are used for the same components in the drawings, and repeated descriptions of the same components are omitted.

FIG. 1 is a diagram illustrating a fully connected layer neural network having a general multi-layer fully coupled hierarchical structure.

Referring to FIG. 1, a unit in which several neurons are gathered is referred to as a layer, and a fully-connected layer structure is a structure in which all cases of each layer are connected. When neurons in the input layer and neurons in the output layer are connected in the same number of cases as possible, it is called a fully connected layer. Such an artificial neural network includes an input layer, a hidden layer, and an output layer.

The input layer receives an input and passes the input to a next layer, and the hidden layer is a fully connected layer connected to the input layer and may be a core layer that can solve a complex problem. Lastly, the output layer is a fully connected layer following the hidden layer and is used to transmit an output signal to the outside of the neural network, and a function of the neural network is determined by an activation function of the output layer.

Here, only one hidden layer is illustrated, and a training process consists of forward pass and backward pass, and then a weight is updated. In this case, matrix operations take the most workloads.

Figure 2:
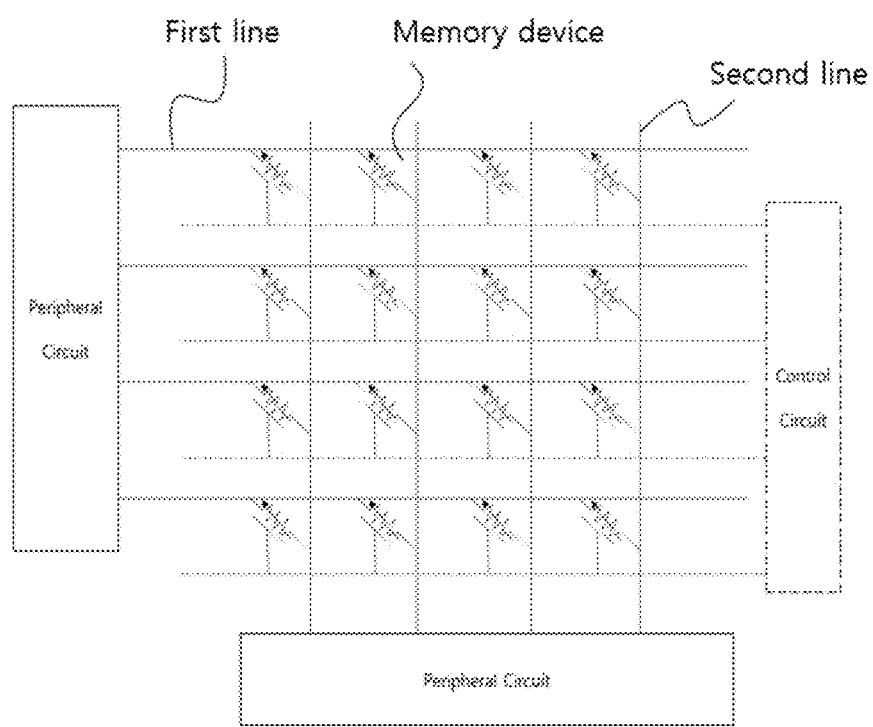
FIG. 2 is a diagram illustrating a synaptic array to which an artificial neural network can be applied.

FIG. 2 is a diagram illustrating a synaptic array to which an artificial neural network can be applied.

Referring to FIGS. 2, the synapse array includes a plurality of first lines extending from a peripheral circuit region, and a plurality of second lines configured to cross the first lines. A three-terminal memory device capable of controlling conductivity is disposed at a portion where a first line and a second line cross each other. The artificial neural network device mostly performs matrix operations, and may substitute a value of each element of a matrix of a corresponding operation with conductivity of each memory element, and may calculate a matrix product by integrating currents that flow when a voltage pulse is given.

Figure 3:
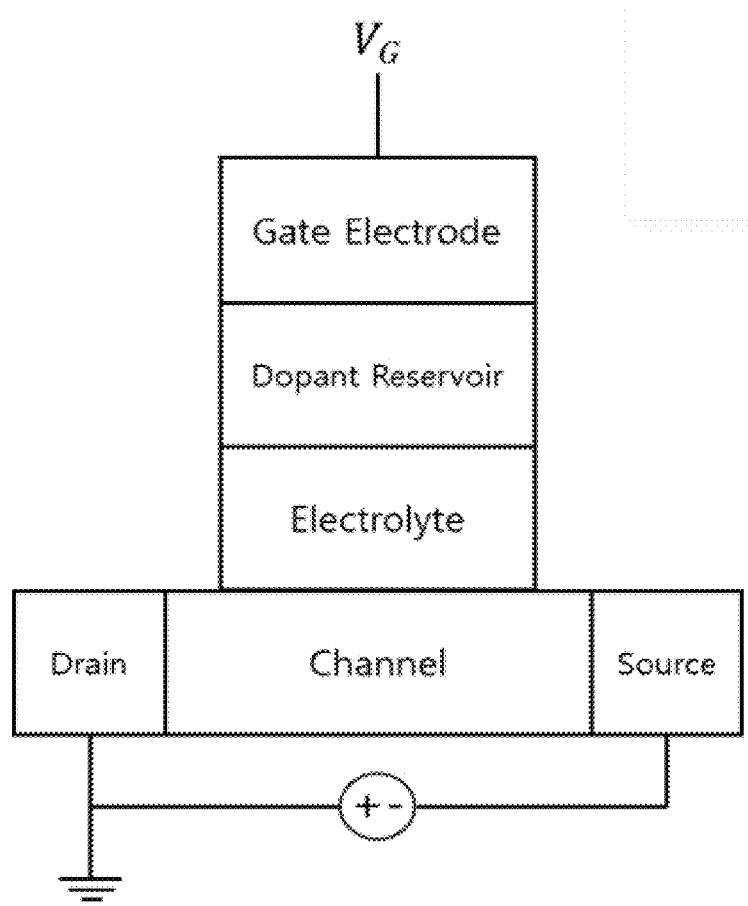
FIG. 3 illustrates a general structure of an ECRAM-based three-terminal memory device.

FIG. 3 illustrates a general structure of an ECRAM-based three-terminal memory device.

Referring to FIG. 3, a source region and a drain region are provided in a semiconductor substrate, and a channel region is provided between the source region and the drain region. A gate stack is provided on the channel region, and the gate stack may include an electrolyte layer, a dopant reservoir layer, and a gate electrode layer. In the three-terminal memory device, when a voltage VG is applied to the gate electrode, movement of ions between the gate electrode and the channel region is caused, which changes the conductivity of the channel material between the source region and the drain region to change. In this case, examples of the ions may include Li ions, H ions, and O ions. The channel material is preferably formed of $WO_3$, PCMO, or the like which is capable of improving in conductivity when ions are accepted. A gate is used as a dopant reservoir layer, and the electrolyte layer is used between the gate and the channel region to facilitate the passage of ions, but limits the passage of currents to minimize a current leakage. Based on these characteristics, an inference process may be performed by applying a voltage between the source and the drain, and a weight update process may be performed by applying a pulse to the gate.

Figure 4:
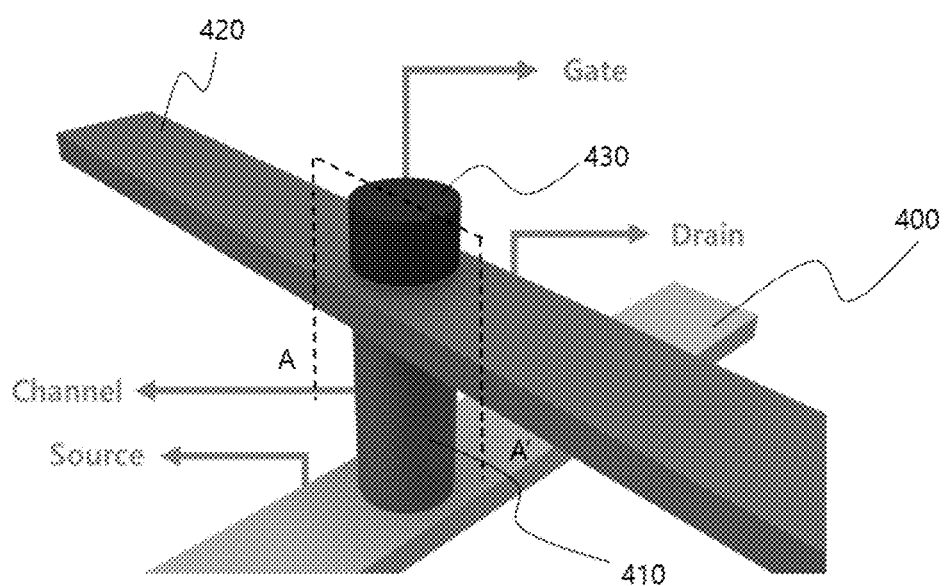
FIG. 4 illustrates a three-terminal vertical memory device according to an embodiment of the present disclosure.

FIG. 4 illustrates a three-terminal vertical memory device according to an embodiment of the present disclosure.

Referring to FIG. 4, a three-terminal vertical memory device according to an exemplary embodiment includes a source electrode 400, a channel region 410, a drain electrode 420, and a gate stack 430.

More specifically, the source electrode 400 in the form of a line extending in a first direction is provided on a semiconductor substrate. The source electrode 400 may include at least one metal material selected from among aluminum, copper, nickel, iron, chromium, titanium, zinc, lead, gold, and silver.

A channel region 410 vertical to the source electrode 400 is provided on the source electrode 400. It is preferable that a predetermined area of a lower side of the channel region 410 is in contact with the source electrode 400 and that the channel region 410 is in the form of a vertical column having a void therein. The channel region 410 is characterized of a vertical columnar shape in which an upper surface, a lower surface, and an inner surface are surrounded by a channel material having a predetermined thickness, and the channel material may include a metal oxide, for example, $WO_3$, $TiO_2$, $ZrO_2$, ZnO, PCMO, or the like.

The drain electrode 420 is spaced apart from the source electrode 400 by a predetermined interval, and more preferably, is spaced apart from the source electrode 400 in an upward direction of the channel region 410 by a predetermined interval. The drain electrode 420 is in contact with a middle portion of the channel region 410 and in the form of a line extending in a second direction crossing the source electrode 400. The drain electrode 420 may include at least one metal material selected from among aluminum, copper, nickel, iron, chromium, titanium, zinc, lead, gold, and silver.

The gate stack 430 is provided on the channel region 410 and is spaced apart from the drain electrode 420 by a predetermined interval. A distance between the gate stack 430 and the drain electrode 420 may be close as long as a short does not occur.

The gate stack 430 may include an electrolyte layer, a dopant reservoir layer, and a gate electrode, and the gate electrode may include a metal layer and a barrier metal layer. For example, the barrier metal layer may be formed of HfOX, hafnium oxide ($HfO_2$), titanium nitride, tantalum nitride, tungsten nitride, hafnium nitride, zirconium nitride, and the like and the metal layer may be formed of any one selected from among tungsten, copper, hafnium, zirconium, titanium, tantalum, aluminum, ruthenium, palladium, platinum, cobalt, nickel, and conductive metal nitrides or a combination thereof.

Figure 5A:
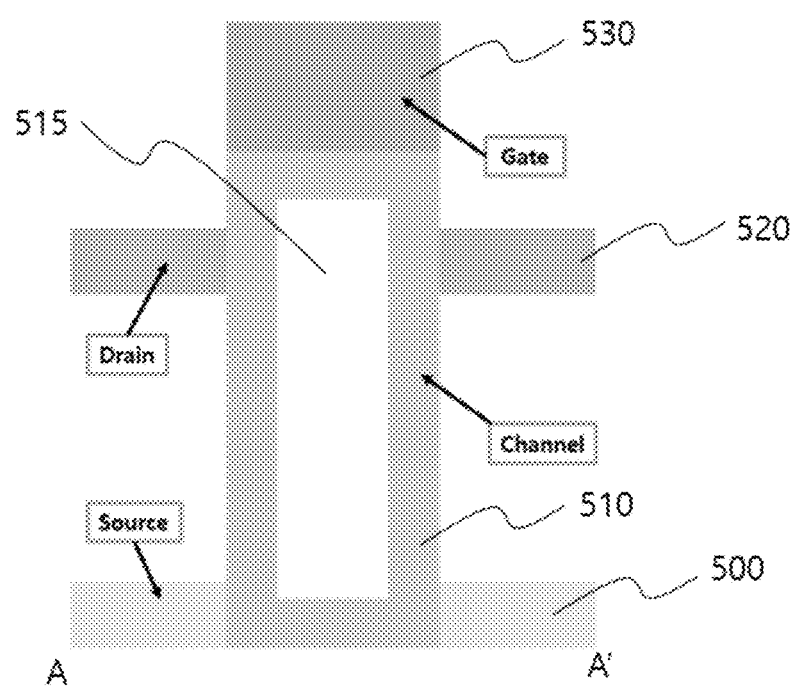
FIGS. 5A and 5B are cross-sectional views illustrating a cross-section taken along line A-A' of FIG. 4.
Figure 5B:
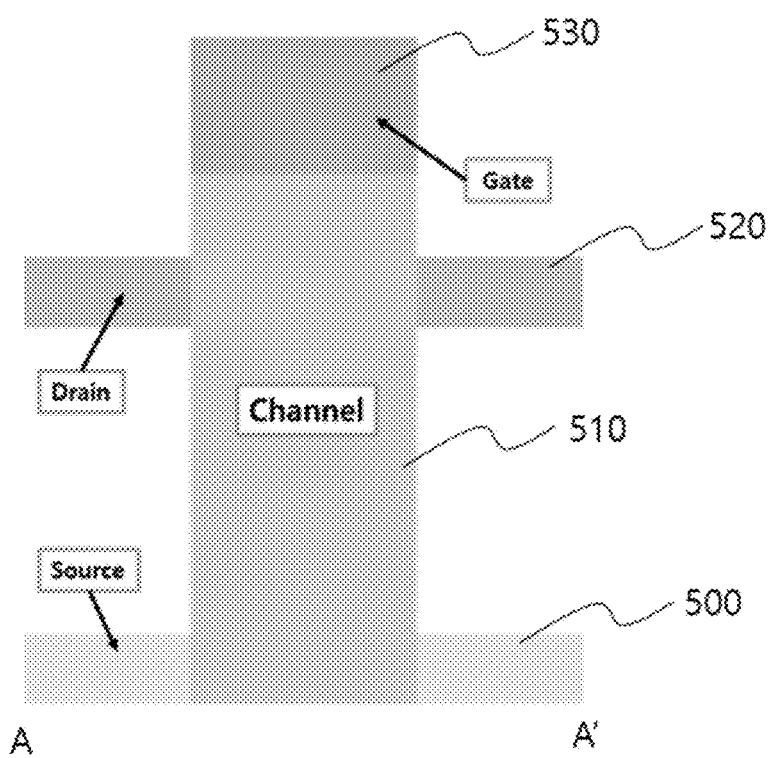

FIGS. 5A and 5B are cross-sectional views illustrating a cross-section taken along line A-A' of FIG. 4.

First, referring to FIG. 5A, a vertical columnar channel region 510 is provided on the semiconductor substrate, and the channel region 510 includes a structure of a void 515 therein.

The source electrode 500 is located at both sides under the channel region 510, and the drain electrode 520 is located at both sides of the channel region 510 spaced apart upward by a predetermined distance from the source electrode 500.

In addition, the gate stack 530 is located on the channel region 510.

Referring to FIG. 5B, a configuration where the channel region 510 does not have the void structure therein is illustrated, and the channel region including the void structure as shown in FIG. 5A has a higher resistivity compared to the structure shown in FIG. 5B because a path through which charges can move is relatively narrower than a charge transfer path of the channel region shown in FIG. 5B.

Figure 6A:
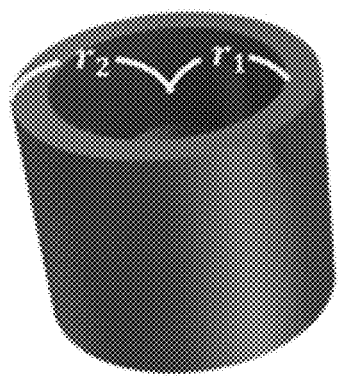
FIGS. 6A and 6B are diagrams for comparison of resistances of a channel region shown in FIGS. 5A and 5B.
Figure 6B:
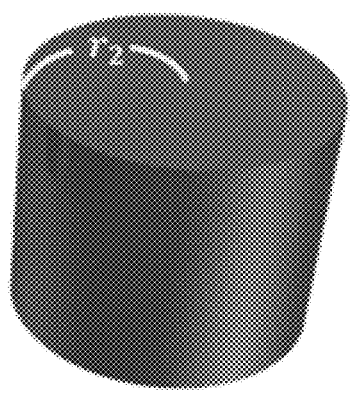

FIGS. 6A and 6B are diagrams for comparison of resistances of the structures shown in FIGS. 5A and 5B, and FIG. 6A is a schematic view of a shape of a channel region including a void structure, and FIG. 6B is a schematic view of a shape of a channel region not including a void structure.

FIG. 6A is a vertical columnar structure having a void therein, and FIG. 6B is a cylindrical structure not having a void therein and completely filled with a channel material. When a height of the channel region is defined as h, the resistance of the structure shown in FIG. 6A may be expressed as in Equation 1 below, and the resistance of the structure shown in FIG. 6B may be expressed as in Equation 2 below.

$$R_{void} = \rho \frac{h}{\pi(r_2^2 - r_1^2)} \quad \langle \text{Equation 1} \rangle$$

$$R_{solid} = \rho \frac{h}{\pi r_2^2} \quad \langle \text{Equation 12} \rangle$$

Therefore, in the channel region including the void structure, it is possible to reduce the conductivity of the device. In addition, it is expressed as, $$\frac{R_{void}}{R_{solid}} = \frac{r_2^2}{r_2^2 - r_1^2} = \frac{1}{1 - \left(\frac{r_1}{r_2}\right)^2},$$

and resistance of the void may be controlled based on a ratio of $$\frac{r_1}{r_2}.$$

FIGS. 7A-7E are cross-sectional views illustrating a method of forming a channel region of a three-dimensional vertical memory device according to an embodiment of the present disclosure.

Figure 7A:
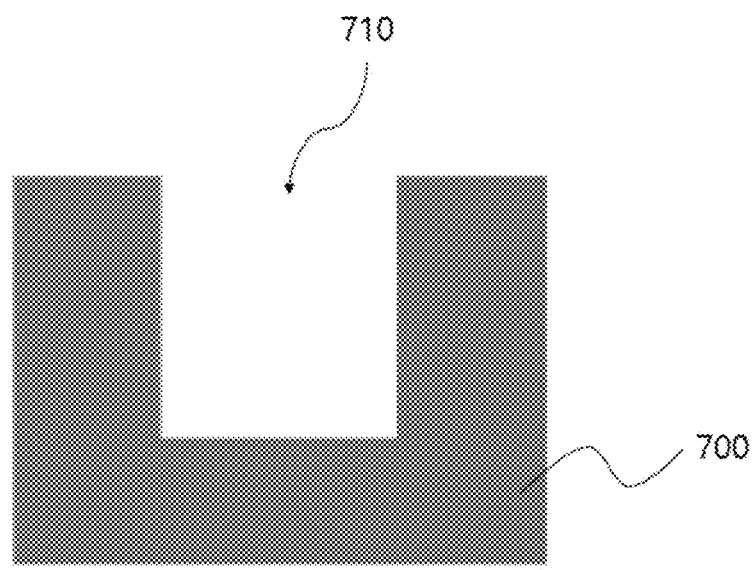
FIGS. 7A-7E are cross-sectional views illustrating a method of forming a channel region of a three-dimensional vertical memory device according to an embodiment of the present disclosure.

First, referring to FIG. 7A, an insulating film 700 is formed on a semiconductor substrate. Here, since the insulating film 700 refers to a material layer other than the channel region, it is not necessarily limited to only the insulating film. A mask pattern for opening the channel region is formed on the insulating film 700. Then, a trench 710 is formed by etching the insulating film to a predetermined depth using the mask pattern as an etch mask. Thereafter, the mask pattern is removed.

Figure 7B:
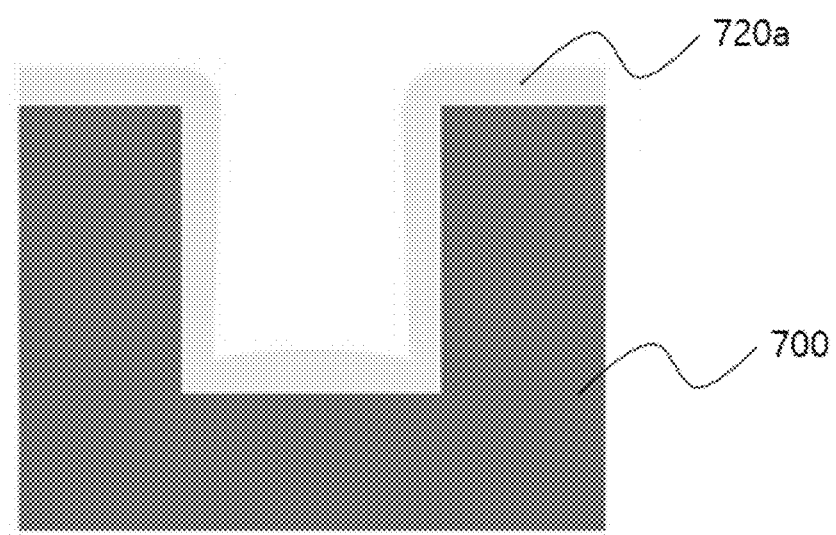
Figure 7C:
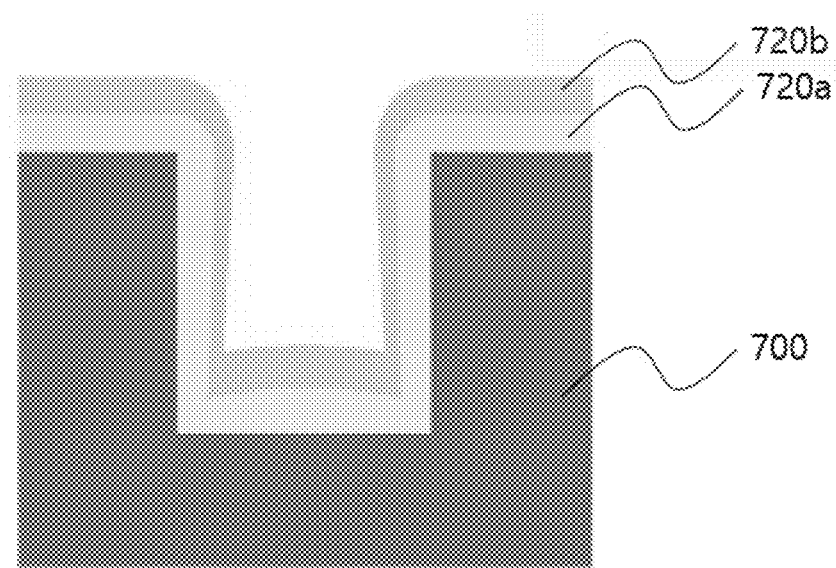
Figure 7D:
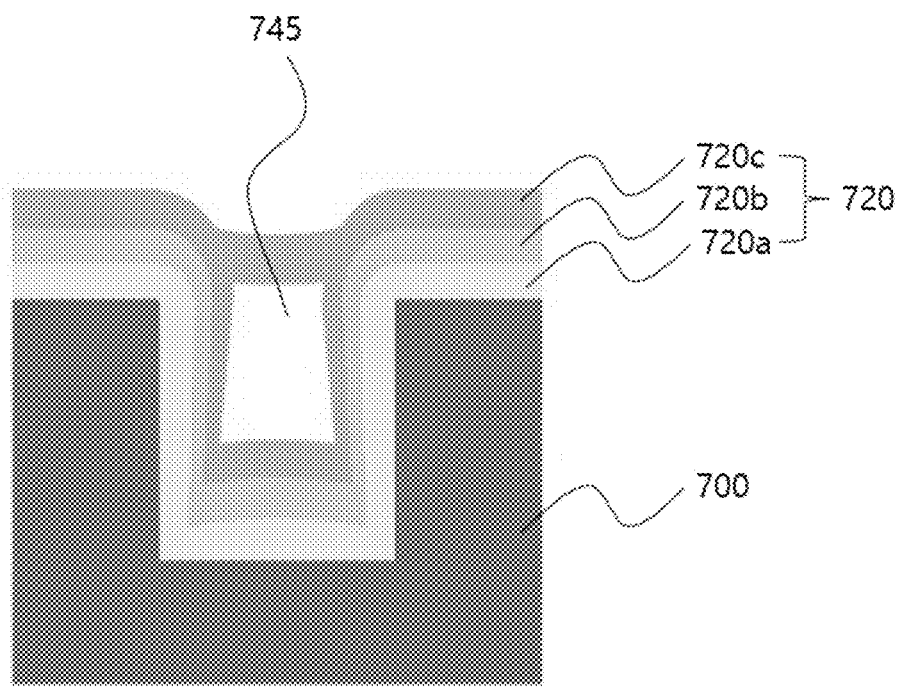

Referring to FIGS. 7B to 7D, a channel material 720 is deposited on the entire surface of the insulating film 700 including the trench 710. The channel material 720 is preferably deposited using a sputtering method. As the channel material 720, a metal material capable of easily oxidation-reduction at room temperature and atmospheric pressure is used, and a metal-oxide is mainly used. For example, the channel material 720 may be formed of a material such as WO3, TiO2, ZrO2, ZnO, PCMO, and the like.

FIGS. 7B to 7D show a process of deposition of the channel material 720 on the trench 710 for each time slot; for example, FIG. 7B may show a shape between 0 minute and 2 minutes after deposition of a channel material 720a, FIG. 7C may show a shape between 2 minutes to 4 minutes after deposition of a channel material 720b, and FIG. 7D may show a shape between 4 minutes and 6 minutes after deposition of a channel material 720c. However, the contents shown in FIGS. 7B to 7D are for explaining a process in which a void structure is generated over time, and the form and time of deposition of the channel material 720 is not necessarily limited thereto.

Through this process, the channel material 720 is relatively less deposited on an inner wall of the trench 710 compared to a bottom of the trench 710 and a top of the insulating film 700, and due to a low step coverage, the channel material 720 fails to completely fill in the trench 710 and is rendered in a state in which the void 745 is formed. Here, the step coverage refers to a degree of uniformity in thickness of a deposited film, and low step coverage means that If there is a step difference in a portion to be deposited, deposition properties for a sidewall are inferior compared to deposition properties for an upper surface. The step coverage is determined by the aspect ratio of a step, and in the memory device according to an embodiment of the present disclosure, the trench aspect ratio of a channel region is increased as much as possible so that the inner wall of the trench is not completely filled with a channel material, compared to an outer region of the trench, thereby causing a void to be formed.

Figure 7E:
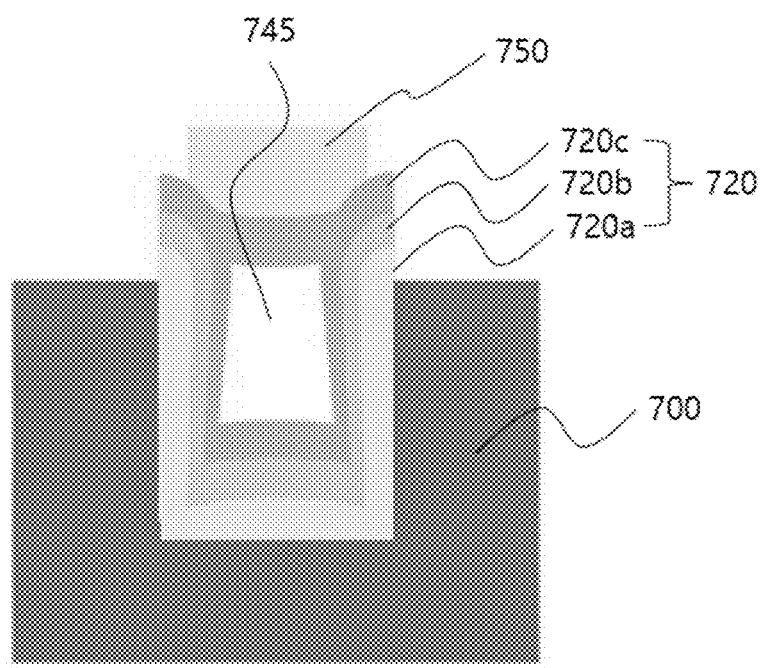

Referring to FIG. 7E, the channel material 720 deposited in the channel region is etched to have the same line width as a line width of the channel region, and then a gate stack 750 is formed on the channel material 720. The gate stack 750 may include an electrolyte layer, a dopant reservoir layer, and a gate electrode, and the gate electrode may include a metal layer and a barrier metal layer. For example, the barrier metal layer may be formed of hafnium oxide (HfO2), titanium nitride, tantalum nitride, tungsten nitride, hafnium nitride, zirconium nitride, and the like, and the metal layer may be formed of any one selected from among tungsten, copper, hafnium, zirconium, titanium, tantalum, aluminum, ruthenium, palladium, platinum, cobalt, nickel, and conductive metal nitrides or a combination thereof.

As described above, a three-dimensional vertical memory device and a manufacturing method thereof according to an embodiment of the present disclosure are mainly characterized of a configuration in which a vertical columnar channel region having a void structure is formed in a three-dimensional (3D) vertical structure where a gate stack, a source electrode, and a drain electrode are vertically disposed, so that a cross-sectional area of the channel region can be reduced to reduce electricity conductivity and power consumption can be reduced to allow a number of matrix operations to be performed efficiently in a short time. In addition, it may contribute to performing training and inference processes in a memory device of an artificial neural network having a multilayer structure.

While the present disclosure has been shown and described with reference to certain exemplary embodiments thereof, it will be understood by those skilled in the art that various changes in form and details may be made therein without departing from the spirit and scope of the invention as defined by the appended claims.

[Detailed Description of Main Elements]

| | |
|---|---|
| 400, 500: source electrode | 410, 510: channel region |
| 420, 520: drain electrode | 515, 745: void |
| 700: insulating film | 710: trench |
| 720: channel material | 430, 530, 750: gate stack |

National Research and Development Project Supporting the Present Disclosure
Project Series Number: 1711129704
Specific Project Number: 2020M3F3A2A01081774

Government Department Name: Ministry of Science and Technology Information and Communication
Research Management Specialized Institution: National Research Foundation of Korea
Research Program Name: Next-generation intelligent semiconductor technology development (R&D)
Research Project Name: Development and demonstration of CMOS process compatible anion-controlled three-terminal neuromorphic synaptic device for high-performance learning and array demonstration
Contribution Rate: 100%
Host Organization: Pohang University of Science and Technology
Research Period: Jan. 1, 2021-Dec. 31, 2021

What is claimed is:

1. A three-dimensional (3D) vertical memory device comprising:
   a semiconductor substrate;
   a vertical columnar channel region provided on the semiconductor substrate and having a void of a predetermined size therein;
   a source electrode and a drain electrode spaced apart from each other with the channel region interposed therebetween; and
   a gate stack formed on the channel region,
   wherein the drain electrode is in contact with a middle portion of the channel region, is spaced apart by a predetermined distance from an upper side of the source electrode, and is in a shape of a line extending in a second direction crossing a first direction.

2. The 3D vertical memory device of claim 1, wherein the source electrode is in contact with a lower side of the channel region and in a shape of a line extending in the first direction.

3. The 3D vertical memory device of claim 1, wherein the channel region is a vertical columnar shape in which an upper surface, a lower surface, and an inner surface are surrounded by a channel material of a predetermined thickness, and the channel material is a metal oxide.

4. The 3D vertical memory device of claim 1, wherein a resistance of the memory device with the channel region having the void therein is expressed as $$R_{void} = \rho \frac{h}{\pi(r_2^2 - r_1^2)},$$

where h denotes a height of the channel region, r1 denotes a distance from a center of the channel region to an outer wall, and r2 denotes a distance from the center of the channel region to an inner wall.

5. A manufacturing method of a three-dimensional (3D) vertical memory device, the method comprising:
   forming a source electrode, an insulating film, and a drain electrode on a semiconductor substrate;
   etching the drain electrode, the insulating film, and the source electrode to form a trench that defines a region;
   depositing a channel material in the trench, wherein the channel material is deposited only on a bottom and an inner wall of the trench to form a vertical columnar channel region having a void structure in the trench; and
   forming a gate stack on the channel region,
   wherein the drain electrode is in contact with a middle portion of the channel region, is spaced apart by a predetermined distance from an upper side of the source electrode, and is in a shape of a line extending in a second direction crossing a first direction.

6. The manufacturing method of claim 5, wherein the source electrode is in contact with a lower side of the channel region and in a shape of a line shape extending in the first direction.

7. The manufacturing method of claim 5, wherein the channel material is formed by depositing a metal oxide in a sputtering method, and a void is lastly formed in the trench due to a difference in deposition degree inside and outside the trench.

8. The manufacturing method of claim 5, wherein the channel region is a vertical columnar shape surrounded by the channel material of a predetermined thickness provided on an upper surface, a lower surface, and an inner surface.

9. The manufacturing method of claim 5, wherein a resistance of the memory device with the channel region having the void structure is expressed as $$R_{void} = \rho \frac{h}{\pi(r_2^2 - r_1^2)},$$

where h denotes a height of the channel region, r1 denotes a distance from a center of the channel region to an outer wall, and r2 denotes a distance from the center of the channel region to an inner wall.

* * * * *